June 18, 1940.   R. R. CHAPPELL ET AL   2,205,164
TEMPERATURE CONTROLLING MEANS
Filed Dec. 9, 1936
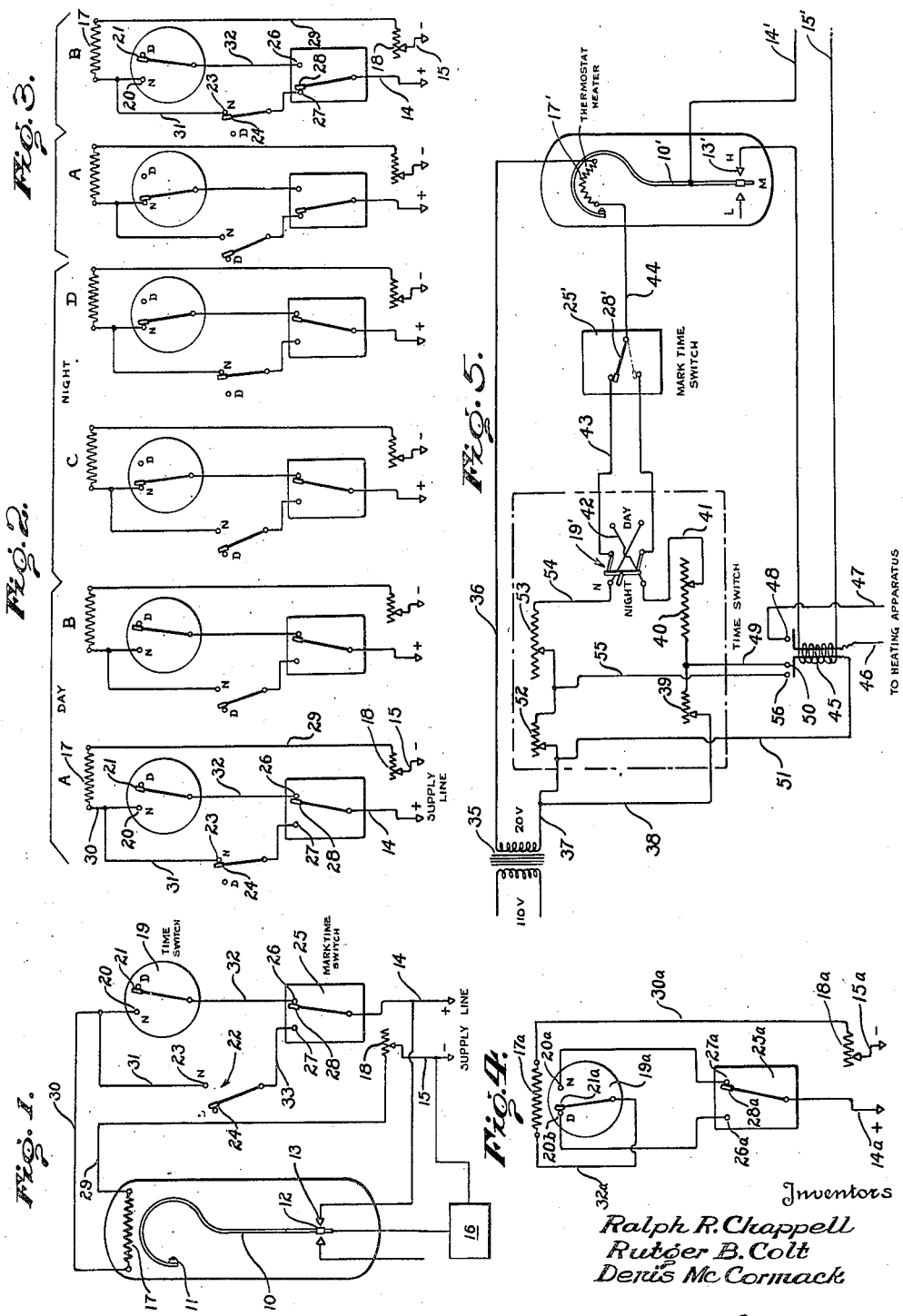

Patented June 18, 1940

2,205,164

UNITED STATES PATENT OFFICE 2,205,164

TEMPERATURE CONTROLLING MEANS

Ralph R. Chappell, Richmond, Va., and Rutger B. Colt and Denis McCormack, Baltimore, Md., assignors to Bendix Aviation Corporation, South Bend, Ind., a corporation of Delaware Application December 9, 1936, Serial No. 115,012

8 Claims. (Cl. 236—46)

This invention relates to temperature controlled means and more particularly to a control system which is adapted for use in controlling the operation of heating plants for residences, offices and the like, or for controlling the operation of devices in accordance with temperature changes.

It has been heretofore proposed to control the operation of heating plants by thermostatic means, whereby the source of heat is energized or the output thereof enhanced whenever the room temperature reaches a predetermined minimum value, said thermostatic means also being effective to cut off the heat supply when a predetermined room temperature is reached. It has also been heretofore proposed to provide artificial heating means adjacent the thermostat during the room heating cycle for the purpose of causing the latter to anticipate the desired maximum room temperature and, hence, to cut off the primary heat supply at its source at such time that the inertia of the heating system will not thereafter raise the room temperature above that which is desired.

Insofar as the applicant is aware, however, no satisfactory means have been heretofore provided for automatically controlling a heating system to cause the same to maintain the room temperature at different levels for predetermined periods of time, during which periods the demand or need for heat is different, such as during the day and the night, a lower temperature and, hence, less heat being desired in most installations during the nighttime. Neither have satisfactory means which are suitable to any installation or conditions of operation been provided in systems of the above character whereby the variations in room temperatures may be kept within suitable limits.

It is accordingly one of the objects of the present invention to provide a novel control system for heating equipment whereby the variations in room temperature above and below a predetermined desired temperature are minimized.

Another object of the invention is to provide novel means for controlling room temperature whereby different predetermined degrees of temperature may be maintained during predetermined periods of time, such as for satisfying day and night demands, by means of a single thermostat and without mechanically varying the setting or adjustment of the latter.

Still another object is to provide novel means in a control system of the above character whereby a desired room temperature is anticipated for the purpose of preventing temperatures in excess of said desired temperature by reason of the so-called inertia of the heating plant or the residual heat which remains in the heating system and flows therefrom after the flame has been extinguished or the draft, in the case of a coal fire, has been reduced.

A further object is to provide a control system which may be so regulated and adjusted as to maintain a room temperature very close to predetermined temperature levels and thereby obtain most efficient operation of the heating plant for both day and night conditions with a minimum of trouble and effort.

A still further object is to provide an extremely flexible, yet simple control system for a heating plant whereby healthful and comfortable temperatures may be automatically maintained at all times.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claims.

In the drawing, wherein like reference characters refer to like parts throughout the several views, Fig. 1 is a diagrammatic view of one form of the novel control system comprehended by the present invention;

Fig. 2 shows the various positions of the switches of said system during normal operation, positions A and B being for daytime or high temperature control and positions C and D being for nighttime or low temperature control;

Fig. 3 shows the switches of said system in positions A and B to illustrate how daytime operation may be continued at night and how nighttime operation of the system may be continued during the day, respectively;

Fig. 4 shows a modification of the system, the thermostat being omitted, wherein daytime conditions may be obtained at night for predetermined periods of time and vice versa; and, Fig. 5 is a diagrammatic illustration of another form of the invention which provides for both plural temperature control and anticipation of the desired room temperatures.

The novel control system in the form illustrated in the accompanying drawing, by way of example, may be employed for controlling any suitable electrically controlled device, such as a signal, an indicator, an electric motor, etc., in response to changes in temperature in a particular locality or region, but will be particularly described in combination with a heating system or plant wherein a gas or oil flame or forced draft to a coal or coke fire are initiated and extinguished or stopped by the operation of electrically operated means controlled by a thermostat located in the region to which heat is supplied by said heating system. In controlling such a system to regulate the temperature of a residence, for example, it is desirable to maintain a higher temperature during the daytime when the residence is in use than at night or when the residence is not in use. The present control system, as shown in Figs. 1 to 3, inclusive, is accordingly so constructed as to provide for automatic temperature control at different desired levels during the times when such temperature levels are normally required and, at the same time, to provide for readily altering the normal routine control with little or no trouble or inconvenience on the part of the occupants.

As diagrammatically shown in Fig. 1, said control system comprises a bimetallic thermostat 10 anchored at 11, the free end thereof being adapted, when the temperature of the surrounding atmosphere drops below a predetermined degree or level, to move contact 12 thereon into engagement with a contact 13 and thus close an electric circuit including a suitable supply line 14, 15 to energize a solenoid actuated valve, a motor, or other electrically controlled device 16, whereby an oil or gas furnace or the like (not shown) is set in operation to supply heat to the desired region through the medium of steam, hot water, hot air, etc. Since any one of various well-known types of apparatus adapted to be controlled by the opening and closing of thermostat contacts 12, 13 may be employed in the above system, it is believed to be unnecessary to illustrate and describe the construction and operation of the same in more detail, said controlled apparatus, per se, constituting no part of the present invention.

Mounted in any suitable place adjacent thermostat 10 is an electric heating element, which may consist of a small electrical resistance 17, constituting a secondary source of heat. The latter is adapted to be connected by novel means including switch means to be hereinafter fully described to supply line 14, 15. Hence, when current is supplied to said heating element to heat the same, the temperature of the air immediately surrounding thermostat 10 is raised a few degrees above the general temperature in the room or locality in which the thermostat is located. It will accordingly be seen that, when heater 17 is energized, a lower room temperature will be required to cause the thermostat to close contacts 12, 13 and, hence, initiate the operation of the heating plant or primary source of heat. Likewise, it will require a lower room temperature to cause said thermostat to again disengage contacts 12, 13, and hence, interrupt the operation of the heating plant. Control or room temperature is thus effected at a lower temperature when heating element 17 is energized than when the same is not connected in the supply circuit. At night, therefore, during the hours of retirement or when no occupants are present, the temperature may be controlled at a lower level by energizing element 17 and thereby conserve fuel without permitting the house to become unduly cold.

For the purpose of varying the difference in the two temperature levels at which control may thus be effected, means are provided for varying the heating effect of temperatures of element 17 so that a single heating element may be readily adapted for use in any installation and under any desired conditions of operation. In the form shown, said means are constituted by a rheostat or variable resistance 18 connected in circuit with said heating element. As the value of said resistance is increased, the voltage drop across element 17 decreases and a corresponding decrease accordingly occurs in the amount of heat dissipated thereby. The difference in the temperatures at which control is effected may thus be decreased by increasing the value of resistance 18 and increased by decreasing the value of said resistance, i. e., that portion of said resistance which is in circuit with element 17.

The switching means, whereby control at the desired temperature levels may be normally automatically obtained during predetermined periods of time and whereby normal routine operation may be easily and quickly varied to suit particular conditions, consists of a time or clock operated switch 19 which includes a stationary contact 20 and a movable contact 21 actuated by a suitable clock mechanism (not shown), a manually actuated switch 22 comprising a stationary contact 23 and a movable contact 24, and what is commonly known in the art as a mark-time switch 25 whereby an electric circuit may be closed or opened for any desired period of time, said mark-time switch including a pair of stationary contacts 26 and 27, a movable contact 28 and clock mechanism (not shown) which may be wound at any time for operation during some predetermined period, such as for an hour, two hours, etc. Contact 28 of said mark-time switch is normally in engagement with contact 26 but is moved into engagement with contact 27 when the clock mechanism thereof is wound and remains in the latter position during the operation of said mechanism. In view of the fact that any one of a large number of well-known types of time switches and mark-time switches which are now commercially available may be employed in the above-described control system, and, since said switches, per se, constitute no part of the present invention, it is not believed to be necessary to illustrate and describe the same in further detail.

In the control circuit hookup shown in Fig. 1, one end of element 17 is connected through a lead 29 and rheostat 18 to one side of the power supply line 14, 15 and the other end thereof is connected through lead 30 to stationary contact 20 of time switch 19 and through a lead 31 to contact 23 of switch 22. Stationary contacts 26 and 27 of switch 25 are connected by means of leads 32 and 33 to movable contacts 21 and 24 of switches 19 and 22, respectively, while movable contact 28 of the mark-time switch, which is normally in engagement with contact 26, is connected to the other side of the power supply line 14, 15.

In describing the operation of the above control system, it will be assumed for the purpose of convenience that said system is being used to control a heating system for a residence wherein it is desired to maintain a higher room temperature during the day and during certain hours of the night than it is desired to maintain at night after retirement or during the day when the house is unoccupied. Also, for the purpose of convenience the positions of switches 19 and 22 are designated D and N to indicate the positions thereof for obtaining day and night temperature control, respectively. It will be understood that time switch 19 may be set to maintain contact 21 in day position from some hour early in the morning just prior to the time that the occupants arise until the usual hour of retirement and in night position during the remainder of each 24-hour period. During the day, therefore, contacts 21 and 28 will normally be in the positions illustrated in Figs. 2A and 2B so that the circuit to heating element 17 will be opened irrespective of the position of switch 22. During the so-called night hours, on the other hand, the time switch moves contact 21 into engagement with contact 20 and thereby closes the circuit to heating element 17 irrespective of the position of switch 22, as illustrated in Figs. 2C and 2D. As was fully pointed out above, the effect of element 17 on the control of the room temperature when the same is connected in the power supply circuit is to lower the room temperature at which thermostat 10 is rendered operative to close and open switch 12, 13 and, hence, at which the heating plant will be rendered operative and again inoperative to supply primary heat to raise said room temperature. Under normal circumstances, therefore, different predetermined temperatures may be automatically maintained during predetermined hours of the day and night without any trouble whatever on the part of the occupants. The daytime temperature may be controlled by adjusting the thermostat, when an adjustable thermostat is provided, and the difference between the day and night temperatures may be regulated by adjusting rheostat 18.

If, during the daytime hours, all of the occupants are absent or if the usual hour of retirement is advanced, the above control system may be readily set to operate on night conditions for any predetermined time even though time switch 19 is ordering daytime temperature, or, if the usual hour of retirement is delayed, day conditions may be continued for a predetermined time merely by setting mark-time switch 25 for operation during the desired time and by setting switch 22 to the night or day position depending upon whether night or day temperature control is desired. In winding said mark-time switch, contact 28 is automatically moved to engage contact 27 and will remain in engagement therewith until the time for which the switch is set has expired. Thus, when the house is unoccupied, for example, during the daytime, mark-time switch 25 may be set for any desired period of operation and switch 22 may be set in night position, as shown in Fig. 3B, to thereby institute control at a lower temperature, the period of operation of said switch being preferably chosen so that the system will have returned to daytime operation when the occupants return. When it is desired to continue daytime temperature control after the usual hour of retirement, the mark-time switch is set for the desired period and switch 22 is moved to day position, as seen in Fig. 3A, thus breaking the circuit to element 17 irrespective of the position of time switch 19.

A slightly modified form of the novel system of the invention is illustrated in Fig. 4, wherein a time switch 19a is provided with a pair of stationary contacts 20a and 20b and a movable contact 21a. The latter is connected to one end of thermostat heating element 17a by lead 32a and said stationary contacts are connected to a pair of stationary contacts 27a and 26a, respectively, of a mark-time switch 25a. Movable contact 28a of the latter switch is connected to one side of supply line 14a, 15a and the other side of the latter is connected through rheostat 18a and lead 30a to element 17a. Thus, with contact 28a normally in the position shown, time switch 19a is normally effective to connect element 17a in circuit with a suitable source of electric energy when contact 21a is in night position and to open the circuit when said contact is in day position, i. e., in positions marked N and D, respectively. By winding mark-time switch 25a and thereby moving contact 28a into engagement with contact 26a, the operation of the system is reversed for some desired period of time, i. e., the system operates during said period to maintain a lower or nighttime temperature during the day or a higher or daytime temperature when the time switch calls for nighttime operation.

In the embodiment of Fig. 5, the novel control system provides for two-temperature control in combination with means whereby the desired room temperature may be anticipated during the room heating cycle, both during the day and night, to prevent the inertia of the heating system from raising the room temperature above that which is desired and to thereby reduce the variations in actual room temperature. In the form shown, electric energy is supplied to heating element 17' adjacent thermostat 10' through an induction coupling 35, one end of the secondary of said coupling being connected by lead 36 to one end of heating element 17'. The other end of said secondary is connected to the other end of element 17' through a plurality of variable resistances, a double-pole, double-throw switch 19', which is preferably clock-operated, and a mark-time switch 25' in a manner and for a purpose to fully appear from the following detailed description of the operation of the system.

For daytime operation, switch 19' is maintained closed in day position, i. e., to the right as viewed in the drawing, and current flows from coupling 35 to element 17' through leads 37, 38, rheostats 39 and 40, leads 41, 42 and 43, switch arm 28', which is normally in the full line position illustrated, and lead 44, the circuit being completed through lead 36. When the room temperature reaches a predetermined low point, the free end of thermostat 10' moves into engagement with contact 13' and thereby closes a circuit 14', 15 from a suitable source of electric energy (not shown) to an electro-magnetic coil 45. The latter, when energized, is effective to actuate a suitable core or solenoid to close a circuit 46, 47 at contact 48 for starting the operation of a furnace or other primary heating means (not shown). Energization of coil 45 also effects the closing of a shunt circuit 49, 50, 51 which by-passes rheostat 39. Thus, during the room heating cycle, i. e., during the operation of the primary heating means, the resistance in the thermostat heater circuit is reduced by the effective elimination or shunting of resistance 39 and element 17' is accordingly caused to dissipate a greater amount of heat and increase the temperature of the atmosphere in the vicinity of thermostat 10'. The latter will then respond to open circuit 14', 15' and stop the operation of the heating plant before the general room temperature reaches the desired value, the room temperature at the point of cut-off preferably being such that the inertia of the heating system will thereafter bring the room temperature up to the desired point. The temperature at which control is desired may be adjusted by varying the value of resistance 40, and the difference between the room temperature desired and the room temperature at which the heating plant is cut off may be varied by adjusting the value of resistance 39.

For nighttime control at a somewhat lower temperature, switch 19' is moved, preferably by a suitable clock mechanism, to night or left-hand position, thereby closing a circuit from coupling 35 to element 17' through lead 37, rheostats 52 and 53, lead 54, the blade of switch 19', lead 43, switch arm 28' and lead 44. It will be noted that the difference between the day and night temperatures at which control is effected depends primarily upon the difference in the values of the portions of resistances 40 and 53 which are in the circuit, the former being comparatively greater to thereby reduce the heat dissipation of element 17' and permit control at a higher temperature. As resistance 40 is comparatively greater than resistance 53 so also resistance 39 is comparatively greater than resistance 52. These resistances are so chosen that the heat quantity added to the element 17' during the heating cycle will have the same incremental value with both pairs of resistances thereby preventing the inertia of the heating system from raising the room temperature above that desired, during both the day and the night cycles. During the room heating cycle at night, resistance 52 is shunted by a circuit comprising lead 55, contact 56 and lead 51 to thereby effectively eliminate the effect of said resistance and increase the heat dissipation of element 17' and, hence, bring about anticipation of the desired room temperature in the same manner as pointed out above in connection with daytime operation.

If it is desired to maintain nighttime or low temperatures during the day or to continue daytime control at night, i. e., after the usual hour of retirement for which the time switch is set, it is only necessary, in the embodiment of Fig. 5, to move switch arm 28' to the dotted line position where the same will remain for the desired length of time to be determined by the setting of the clock mechanism of mark-time switch 25'.

There is thus provided a novel control system for heating plants, signals, indicators, and the like, whereby control may be effected at two or more temperature levels during predetermined periods of time by means of a single thermostat and whereby the desired temperatures may be anticipated by the thermostat in order to obviate the usual over-shooting of the desired temperature by reason of the so-called inertia of the heating system and, hence, to reduce the variations in room temperature during said periods. The novel system provided is simple, both in construction and operation and includes, in addition to the above, means for obtaining control at either of two temperature levels at any time and for any desired period of time without disturbing the adjustment of the thermostat and with little or no inconvenience to the occupants.

Although only a limited number of embodiments of the novel control system of the present invention have been illustrated and described in detail, it is to be expressly understood that the same is not limited to these specific embodiments, but that various changes may be made therein, such as in the particular wiring arrangement shown, without departing from the spirit and scope of the invention. For a definition of the limits of the invention, reference is had primarily to the appended claims.

What is claimed is:

1. In apparatus of the class described, an electric circuit, a thermostat for opening and closing said circuit, an electric heating element adjacent said thermostat, and means for connecting said element to a source of electric energy, said last-named means including a pair of electrical resistors of different values, clock-operated switch means for connecting one or the other of said resistors in series with said source and said element and switch means for connecting one or the other of said resistors in series with said source and element in opposition to said first-named switch means for a predetermined period of time.

2. In apparatus of the class described, an electric circuit, a thermostat for opening and closing said circuit, an electric heating element adjacent said thermostat, and means connecting said element to a source of electric energy including two pairs of electrical resistors, the resistors of each of said pairs being connected in series, switch means for connecting one or the other of said pairs in circuit with said source and said element and means for shunting one of the resistors of either of said pairs when said first-named circuit is closed by said thermostat.

3. In apparatus of the class described, an electric circuit including an electro-magnetic device, a thermostat for closing and opening said circuit to energize and deenergize said device, an electric heating element adjacent said thermostat, and means connecting said element to a source of electric energy including two pairs of electrical resistors, the resistors of each of said pairs being connected in series, switch means for connecting one or the other of said pairs in circuit with said source and said element and switch means operable by said electro-magnetic device for shunting one of the resistors of either of said pairs.

4. In a heating system wherein a source of heat is provided, means for controlling said source, a thermostat including a temperature responsive element for controlling said means, an electrical heating element effective upon said temperature responsive element, a source of electrical energy connected to said heating element, means including one resistance controlling the flow of said electrical energy to said electrical heating element to control the heat inertia of said heating source, and means including another resistance controlling the effect of said heating element upon said temperature responsive element whereby different temperatures are maintained by said thermostat.

5. In an apparatus of the class described, an electric circuit, a thermostat for controlling said circuit, an electric heating element effective upon said thermostat, a source of energy, two pairs of resistances connected to said source, one of said pairs substantially reducing the effect of said heating element, clock operated means for connecting one or the other of said pairs to said heating element, and means actuated by said thermostat to control one of the resistances of each of said pairs, whereby the effect of said heating element may be varied.

6. A device of the character described, comprising a thermostat, an electric circuit adapted to be opened and closed by said thermostat, heating means adjacent said thermostat, a circuit connecting said heating means to a source of electric energy, including a clock-operated switch for opening and closing said last named circuit, a second clock-operated switch, a circuit controlled by said second clock-operated switch in series with said first clock-operated switch in one position of said second clock-operated switch, and means including a manually operated switch arm for by-passing said first clock-operated switch at another position of said second clock-operated switch.

7. A device of the character described, comprising a thermostat, an electric circuit adapted to be opened and closed by said thermostat, a heating element adjacent said thermostat, and a circuit connecting said heating element to a source of electric energy, including a clock-operated switch arm connected to one terminal of said heating element, a pair of contacts cooperating with said switch arm, a second clock-operated switch arm, and a pair of contacts cooperating with said second switch arm and connected relatively to the first named pair of contacts, the other terminal of the heating element and said second switch arm being connected with a source of power.

8. In a device of the character described, a thermostat, a circuit adapted to be opened and closed by said thermostat, heating means adjacent said thermostat, a circuit connecting said heating means to a source of electrical energy, said last-named circuit including a clock-operated switch movable to a first or second position for respectively subjecting the heating means to either a first or second condition of operation, said circuit also including a clock-controlled switch for subjecting the heating means to said first condition of operation while the clock-operated switch occupies said second position, and for subjecting the heating means to said second condition while the clock-operated switch occupies said first position.

RALPH R. CHAPPELL.
RUTGER B. COLT.
DENIS McCORMACK.